United States Patent Office 3,061,599
Patented Oct. 30, 1962

3,061,599
CATALYTIC POLYMERIZATION OF ALKYL ESTERS OF ACRYLIC AND METHACRYLIC ACIDS IN HETEROGENEOUS MIXTURE
Louis De Vries, Kentfield, and John R. Thomas, Lafayette, Calif., assignors to California Research Corporation, San Francisco, Calif., a corporation of Delaware
No Drawing. Filed Aug. 28, 1959, Ser. No. 836,608
3 Claims. (Cl. 260—89.5)

This invention relates to an improved process for the polymerization of esters. More specifically, it relates to an improved process for the polymerization of alkyl esters of acrylic and methacrylic acids employing lithium aluminum hydride catalyst.

Polymerization of alkyl esters of acrylic and methacrylic acids is generally known. A great number of polymerization processes, both catalytic and noncatalytic, the latter involving high temperatures, have been described in the literature. Reactions take place at varying temperatures, pressures, and concentrations of reagents. In the catalytic process, many compounds have been suggested as catalysts, such as oxygen; ozone; salts of prechloric and persulfuric acids; sulfur dioxide; organic azo compounds; hydrophosphates; carboxylic acids; aryl amine mixtures; peroxides, such as hydrogen, acetyl, lauroyl, succinyl, and benzoyl peroxides.

The processes of the prior art suffer from many disadvantages. For example, the product obtained has a relatively low melting point and is essentially a random polymer having little or no crystalline character and the degree of polymerization is frequently low. Some of these undesirable features have been overcome by the use of unusually low temperature conditions, coupled with the use of unique polymerization catalyst systems not commercially practicable.

It has now been found that lithium aluminum hydride catalyzes the polymerization of alkyl esters of acrylic and methacrylic acids, wherein the esterifying alcohol is a fatty alcohol having preferably from 1 to 14 C atoms. More specifically, it has been found that lithium aluminum hydride solid in a state of fine subdivision is an effective polymerization catalyst at ordinary ambient temperatures.

The nature of the invention is all the more surprising when it is considered that not only has the lithium aluminum hydride catalyst not been employed in the past, but indeed is contraindicated in view of the fact that lithium aluminum hydride is well known as a reducing agent, reducing esters to alcohols. Hence, it is totally unexpected that lithium aluminum hydride should act so as to polymerize alkyl esters of acrylic and methacrylic acids. For best results and for the highest efficiency of the catalyst, its particle size should be of the order of semicolloidal dimensions; for example, from about 20 Angstroms up to 500 or even 1000 Angstroms. Larger particle sizes are effective for the polymerization but the relative efficiency in catalyst utilization falls off directly as the particle size is increased. In general, the degree of polymerization will tend to be greater as the temperature is decreased and as smaller amounts of polymerization catalyst are used relative to the amount of monomer used.

A particularly useful method in the preparation of the catalyst in a fine state of subdivision is to add solid LiAlH$_4$, a form in which LiAlH$_4$ is readily available commercially, to an inert solvent, for example, to ethyl ether, to form a saturated solution. This solution is then added to an inert organic liquid, hereinafter referred to as a "nonsolvent," in which LiAlH$_4$ is essentially insoluble, such as isopentane and octane.

The nonsolvent can contain the acrylate monomer dispersed therein prior to the admixing with catalyst. Alternatively, the monomer can be added after the formation of the finely divided LiAlH$_4$ solid. The presence of the monomer in the nonsolvent prior to the mixing with LiAlH$_4$ solution makes for a particularly active in situ polymerization system. Admixing of LiAlH$_4$ solution with the nonsolvent prior to the addition of the monomer may tend to reduce catalytic activity per gram of catalyst, i.e., catalyst efficiency, but notwithstanding this tendency, polymerization readily occurs by increasing catalyst concentration. In general, the amount of LiAlH$_4$ catalyst is employed in proportions ranging from 5 to 1000 mols, preferably 10 to 100 mols, of monomer per mol of LiAlH$_4$.

The amount of nonsolvent employed in making the finely divided catalyst is not critical, and will depend on the concentration of the lithium aluminum hydride solution, which in turn depends on the solvent employed in making the catalyst solution. For example, at 25° C. per 100 ml. of solvent, lithium aluminum hydride is soluble in diethyl ether to the amount of 25–30 g.; in tetrahydrofuran, 13 g. In general, sufficient nonsolvent is employed so as to keep the lithium aluminum hydride from settling out from the liquid, the upper limit as to nonsolvent content not being particularly significant, the limiting factors being size of equipment, and handling problems attendant large volumes of material.

In a preferred embodiment of the invention, a small amount of an oil-soluble polymeric dispersant is placed in the nonsolvent prior to the mixing with the LiAlH$_4$ solution. In this case, the monomer addition may be made after the mixing of the two liquid systems, nonsolvent plus dispersant, and the LiAlH$_4$ solution or to the nonsolvent plus dispersant with subsequent admixture with the LiAlH$_4$ solution. That is to say, the order of contacting the three components, the ester, the lithium aluminum hydride solution, and the oil-soluble polymeric macromolecular dispersant solution, is not critical so long as care is exercised not to bring the lithium aluminum hydride solution and the monomeric ester into contact with each other in the absence of the oil-soluble polymeric macromolecular dispersant solution.

The solution of lithium aluminum hydride is prepared in known fashion by dissolving lithium aluminum hydride in inert solvent. Diethyl ether and tetrahydrofuran are preferred as solvents because of the comparatively higher solubility of lithium aluminum hydride in them, thereby permitting the employment of smaller volumes of lithium aluminum hydride solution. For the same reason, it is preferred to employ highly concentrated or saturated solutions of lithium aluminum hydride. In general, the solutions employed will have a concentration of at least 2 g. per 100 ml. of solvent, with the higher concentrated solution being preferred, as aforesaid.

The solution of the oil-soluble polymeric macromolecular dispersant is prepared as described in copending application Serial No. 762,239, now U.S. Patent No. 2,995,527, i.e., by dissolving the dispersant in an aliphatic hydrocarbon solvent which is liquid at the desired operating temperatures, such as n-heptane and n-hexane. As described in the aforesaid application, oil-soluble polymeric macromolecular dispersants are taught having a molecular weight ranging from about 2000 to 500,000 and containing in the molecule about 80 to 98% oleophilic groups and from 20 to 2% of polar groups, the molecular weights being those determined by the standard light scattering method, such as described in D'Alelio, "Fundamental Principles of Polymerization," Wiley & Sons, New York (1952), pp. 256–267. Thus, a typical polymeric macromolecular dispersant is the following copolymer containing two monomers: (A) alkyl methacrylate in which the alkyl groups are mixed alkyl groups containing 12, 13, and 18 carbon atoms each, and (B) polyethylene glycol dodecyl ether monomethacrylates in which the polyethylene glycol group has a molecular weight of about 3500, the ratio of (A) to (B) being approximately 20:1, the molecular weight of said copolymer being approximately 200,000.

The solution of the oil-soluble polymeric macromolecular dispersant dissolved in the inert aliphatic hydrocarbon nonsolvent can contain from 0.25 to 5% dispersant by volume in terms of solvent, although amounts ranging from 0.25 to 0.75% are preferred. Amounts under 0.25% are generally insufficient to effectively form the suspensoid, and the presence of amounts of 5% causes the solution to become so viscous that it is difficult to handle. The ratio by volume of lithium aluminum hydride solution to oil-soluble polymeric macromolecular dispersant solution can range from 1:10 to 1:100, although ranges of 1:25 to 1:75 are preferred.

The invention can better be illustrated by means of the following examples which, however, are not intended in any way to limit it.

*Example I*

To 200 cc. of dry n-hexane containing in solution 1% by weight of Acryloid 917 (Rohm and Haas), which is a copolymer of $C_{12}$–$C_{18}$ alkyl methacrylates copolymerized with N-vinylpyrollidone, and having a molecular weight about 200,000 to 300,000, 5 cc. of a saturated ether solution of lithium aluminum hydride, containing 1.5 g. $LiAlH_4$ per 100 cc. ether, is added dropwise at room temperature under vigorous stirring. A fine suspension results. To this suspension a 40 cc. quantity of dry methyl methacrylate is added. In spite of water-cooling of the outside of the container there is an immediate sharp temperature increase and polymer precipitates at once. After the polymerization reaction has subsided, methanol is added in order to decompose any unreacted lithium aluminum hydride. The product is collected by filtration and dissolved in acetone. After filtration of the acetone solution, pentane is added to precipitate the polymethyl methacrylate. A high-melting polymer in 30% yield is obtained.

*Example II*

The procedure described in Example I is followed except that the monomer is lauryl methacrylate. In this case the polymer does not precipitate but the solution becomes very viscous. In order to recover the product, the solution is diluted with hexane and filtered. Methanol is added to the filtrate to precipitate the polylauryl methacrylate.

*Example III*

To a solution of 200 cc. dry n-hexane containing 40 cc. of methyl acrylate is added 5 cc. of a saturated diethyl ether solution of $LiAlH_4$. Polymerization occurs and the polymer is recovered as in Example II.

*Example IV*

Example III is repeated, except that methyl methacrylate is used in place of methyl acrylate. A high-melting polymer is obtained.

The operating principles of this invention are not fully understood, but it is believed that when the solution of lithium aluminum hydride is contacted with the polymeric macromolecular dispersant solution, the small semi-colloidal particles of lithium aluminum hydride are at least partially enveloped or complexed by the polar portion of the monomer, thereby keeping the size of the particles quite small, but this interaction between the dispersant and $LiAlH_4$ particle does not affect the catalytic ability of the $LiAlH_4$ and may, in fact, be enhancing same.

The catalyst is readily obtainable commercially, and the process itself is well adapted to commercial use.

We claim:

1. Process for polymerizing an alkyl ester selected from the group consisting of alkyl esters of acrylic acid and methacrylic acid, which comprises contacting the ester at a temperature in the range $-10°$ C. to $+50°$ C. with a suspension of lithium hydride catalyst of semi-colloidal dimension, said suspension being obtained by contacting a solution of lithium aluminum hydride with an organic nonsolvent in the presence of a solution of an oil-soluble polymeric macromolecular dispersant, the solution of the polymeric macromolecular dispersant containing 0.25 to 5 percent dispersant by volume, the catalyst being employed in a mol ratio to the ester ranging from 1 to 5–1000, and the lithium aluminum hydride solution being employed in a volume ratio to the polymeric macromolecular dispersant solution ranging from about 1:10 to 1:100.

2. Process according to claim 1 wherein the solvent for the polymeric macromolecular dispersant is a nonsolvent for the lithium aluminum hydride.

3. Process according to claim 2 wherein the solution of lithium aluminum hydride is a saturated diethyl ether solution.

References Cited in the file of this patent

UNITED STATES PATENTS

| | | |
|---|---|---|
| 2,608,555 | Bullitt | Aug. 26, 1952 |
| 2,699,457 | Ziegler | Jan. 11, 1955 |
| 2,832,759 | Nowlin et al. | Apr. 29, 1958 |
| 2,841,574 | Foster | July 1, 1958 |
| 2,846,427 | Findlay | Aug. 5, 1958 |

OTHER REFERENCES

Schildknecht: "Polymer Processes," Interscience (1956), page 229.

Snyder et al.: J. Amer, Chem. Soc., vol. 76, April 1954, pages 1893–1898, page 1897 relied upon.

UNITED STATES PATENT OFFICE
CERTIFICATE OF CORRECTION

Patent No. 3,061,599                          October 30, 1962

Louis De Vries et al.

It is hereby certified that error appears in the above numbered patent requiring correction and that the said Letters Patent should read as corrected below.

Column 1, line 25, for "hydrophosphats" read -- hypophosphates --.

Signed and sealed this 7th day of May 1963.

(SEAL)
Attest:

ERNEST W. SWIDER
Attesting Officer

DAVID L. LADD
Commissioner of Patents